United States Patent
Xu

(10) Patent No.: US 10,623,228 B2
(45) Date of Patent: Apr. 14, 2020

(54) SYMBOL SYNCHRONIZATION METHOD AND SIGNAL RECEIVING CIRCUIT

(71) Applicant: ALi Corporation, Hsinchu (TW)

(72) Inventor: Yu-Ting Xu, Shanghai (CN)

(73) Assignee: ALi Corporation, Hsinchu (TW)

( * ) Notice: Subject to any disclaimer, the term of this patent is extended or adjusted under 35 U.S.C. 154(b) by 0 days.

(21) Appl. No.: 16/439,476

(22) Filed: Jun. 12, 2019

(65) Prior Publication Data

US 2020/0014574 A1    Jan. 9, 2020

(30) Foreign Application Priority Data

Jul. 6, 2018  (CN) .............................. 201810736732

(51) Int. Cl.
  *H04L 27/26*    (2006.01)

(52) U.S. Cl.
  CPC ...... *H04L 27/2663* (2013.01); *H04L 27/2689* (2013.01)

(58) Field of Classification Search
  CPC ............. H04L 27/2613; H04L 27/2692; H04L 27/2675; H04L 27/2663; H04L 27/2655; H04L 27/2602; H04L 27/2656; H04L 2027/0073
  USPC .......................................... 375/260, 354–356
  See application file for complete search history.

(56) References Cited

U.S. PATENT DOCUMENTS

| | | | |
|---|---|---|---|
| 6,771,591 B1* | 8/2004 | Belotserkovsky | H04L 27/2662 370/208 |
| 7,548,579 B1* | 6/2009 | Murphy | H04L 27/2656 375/147 |
| 2004/0170237 A1 | 9/2004 | Chadha et al. | |
| 2005/0078773 A1* | 4/2005 | Astrachan | H03D 7/161 375/343 |
| 2005/0117667 A1* | 6/2005 | Yajima | H04L 27/2605 375/324 |
| 2005/0220175 A1* | 10/2005 | Zhou | H04L 27/2662 375/141 |
| 2010/0091742 A1* | 4/2010 | Lee | H04L 7/042 370/336 |
| 2010/0284477 A1* | 11/2010 | Kwon | H04B 7/0417 375/260 |
| 2011/0090973 A1* | 4/2011 | Mishra | H04L 5/0025 375/260 |
| 2017/0019287 A1* | 1/2017 | Yang | H04L 27/2655 |
| 2018/0220466 A1* | 8/2018 | Park | H04W 74/0833 |

* cited by examiner

*Primary Examiner* — Emmanuel Bayard
(74) *Attorney, Agent, or Firm* — J.C. Patents

(57) ABSTRACT

A symbol synchronization method is provided according to an embodiment of the disclosure. The method includes: receiving an input signal which includes a plurality of symbols; performing a cross-correlation operation on a plurality of first samples of the input signal according to a known sequence of a first type symbol among the symbols to obtain a plurality of cross-correlation results; accumulating the cross-correlation results to obtain an ending position of the first type symbol; delaying a plurality of second samples of the input signal according to a length of a second type symbol among the symbols to perform an auto-correlation operation; and correcting the ending position according to an operation result of the auto-correlation operation. In addition, a corresponding signal receiving circuit is provided according to an embodiment of the disclosure.

20 Claims, 7 Drawing Sheets

SYMBOL SYNCHRONIZATION METHOD AND SIGNAL RECEIVING CIRCUIT

CROSS-REFERENCE TO RELATED APPLICATION

This application claims the priority benefit of China application serial no. 201810736732.5, filed on Jul. 6, 2018. The entirety of the above-mentioned patent application is hereby incorporated by reference herein and made a part of this specification.

BACKGROUND

Technical Field

The disclosure relates to a wireless local area network (WLAN) communication technique, and in particular, to a symbol synchronization method and a signal receiving circuit.

Description of Related Art

In wireless communication techniques of wireless local area networks, a signal receiving terminal is required to detect a boundary position of specific wireless signal in the received wireless signal to accurately retrieve the data in the signal for processing. Generally, the signal receiving terminal may perform a cross-correlation operation or an auto-correlation operation on the signal to attempt to position a preamble ending position of the signal. However, whether the cross-correlation operation or the auto-correlation operation is adopted, it is very likely that errors may occur in subsequent positioning, which results in decoding errors.

SUMMARY

The disclosure provides a symbol synchronization method and a signal receiving circuit that can enhance efficiency and accuracy of symbol synchronization performed by the signal receiving terminal.

An embodiment of the disclosure provides a symbol synchronization method including the following steps. An input signal including a plurality of symbols is received. A cross-correlation operation is performed on a plurality of first samples of the input signal according to a known sequence of a first type symbol among the symbols to obtain a plurality of cross-correlation results. The cross-correlation results are accumulated to obtain an ending position of the first type symbol. A plurality of second samples of the input signal are delayed according to a length of a second type symbol among the symbols to perform an auto-correlation operation. The ending position is corrected according to an operation result of the auto-correlation operation.

Another embodiment of the disclosure provides a signal receiving circuit including a receiving circuit and a symbol synchronization circuit. The receiving circuit is configured to receive an input signal, wherein the input signal includes a plurality of symbols. The symbol synchronization circuit is connected to the receiving circuit and is configured to perform a cross-correlation operation on a plurality of first samples of the input signal according to a known sequence of a first type symbol among the symbols to obtain a plurality of cross-correlation results and to delay a plurality of second samples of the input signal according to a length of a second type symbol among the symbols to perform an auto-correlation operation. The symbol synchronization circuit is further configured to accumulate the cross-correlation results to obtain an ending position of the first type symbol and correct the ending position according to an operation result of the auto-correlation operation.

In light of the above, after the input signal is received, the cross-correlation operation may be performed on some samples of the symbols in the input signal according to the known sequence of the first type symbol to obtain the cross-correlation results. By accumulating the cross-correlation results, the ending position of the first type symbol can be preliminarily obtained. Moreover, after the input signal is received, some samples may be delayed according to the length of the second type symbol to perform the auto-correlation operation. According to the operation result of the auto-correlation operation, the ending position of the first type symbol can be corrected. Thereby, the accuracy of symbol synchronization performed by the signal receiving circuit on the input signal can be effectively enhanced.

To provide a further understanding of the aforementioned and other features and advantages of the disclosure, exemplary embodiments, together with the reference drawings, are described in detail below.

DESCRIPTION OF THE EMBODIMENTS

Figure 1:
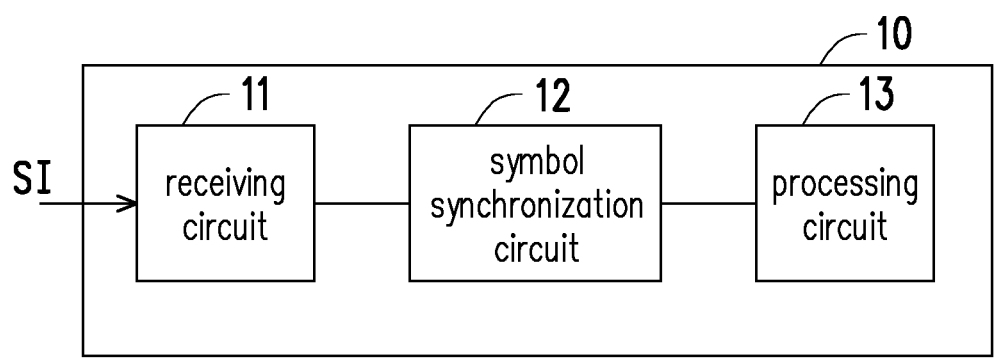
FIG. 1 is a schematic diagram illustrating a signal receiving circuit according to an embodiment of the disclosure.

FIG. 1 is a schematic diagram illustrating a signal receiving circuit according to an embodiment of the disclosure. Referring to FIG. 1, a signal receiving circuit 10 may be a receiving circuit for a wireless local area network. The signal receiving circuit 10 includes a receiving circuit 11, a symbol synchronization circuit 12, and a processing circuit 13. The receiving circuit 11 is configured to receive a signal SI (also referred to as an input signal). The signal SI is compatible with IEEE 802.11 series wireless communication standards. For example, the signal SI may be compatible with wireless communication standards associated with wireless local area networks, such as IEEE 802.11a/n/ac. The receiving circuit 11 may perform signal reception operations (e.g., analog-digital conversion, signal amplification, gain control, signal filtering, and/or channel compensation) on the signal SI.

The symbol synchronization circuit 12 is connected to the receiving circuit 11 to perform symbol synchronization on the signal SI output by the receiving circuit 11, such that the accurate position interval of a signaling symbol and a data symbol in the signal SI can be obtained to facilitate subsequent processing (e.g., transformation, demodulation, etc.) performed on the signal SI.

The processing circuit 13 is connected to the symbol synchronization circuit 12 to perform other signal analysis operations (e.g., cyclic prefix (CP) removal, serial/parallel (S/P) conversion, fast Fourier transform (FFT), channel estimation, demodulation, etc.) on the signal SI of which the symbol boundary has been confirmed/detected by the symbol synchronization circuit 12.

Figure 2:
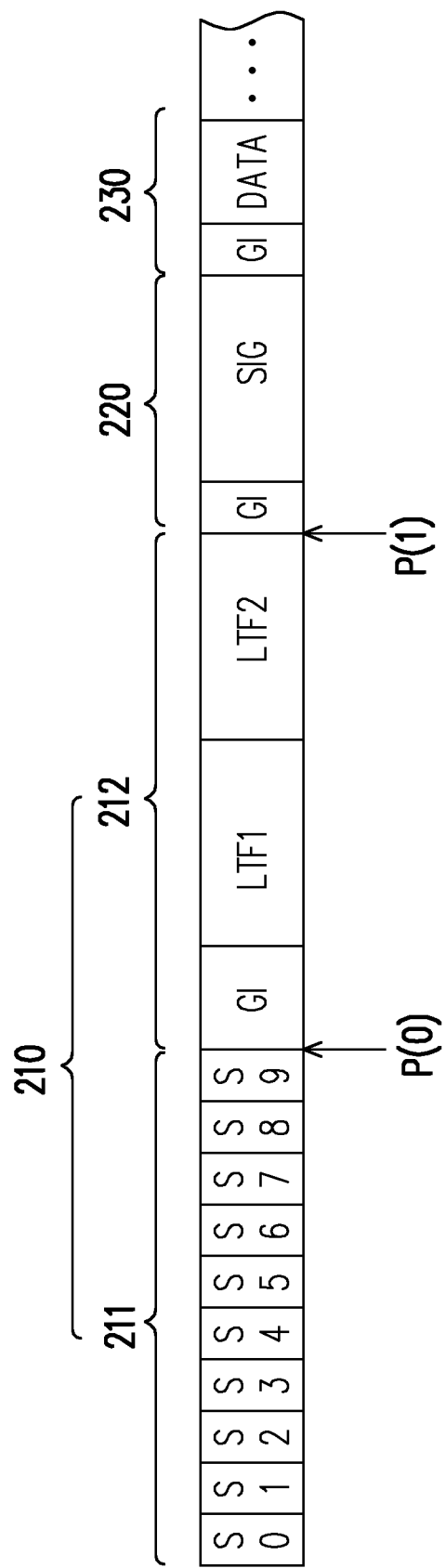
FIG. 2 is a schematic diagram illustrating a packet structure of an input signal according to an embodiment of the disclosure.

FIG. 2 is a schematic diagram illustrating a packet structure of an input signal according to an embodiment of the disclosure. Referring to FIG. 2, a packet structure of the signal SI includes a preamble portion 210, a signaling symbol portion 220, and a plurality of data symbol portions 230 (only one is shown in FIG. 2 as example). The preamble portion 210 is defined according to the IEEE 802.11a/n/ac standard. The preamble portion 210 includes a short training symbol portion 211 and a long training symbol portion 212. The short training symbol portion 211 includes a plurality of short training symbols S0 to S9, and the long training symbol portion 212 includes a guard interval GI, a long training symbol LTF1, and a long training symbol LTF2. The signaling symbol portion 220 includes a guard interval GI and a signaling symbol SIG. Each of the data symbol portions 230 includes a guard interval GI and a data symbol DATA.

For ease of illustration, the ending position (i.e., the ending position of the last short training symbol S9) of the short training symbol portion 211 is marked as P(0), and the ending position of the long training symbol portion 212 is marked as P(1). From another perspective, P(0) is also the starting position of the long training symbol portion 212 and P(1) is also the starting position of the signaling symbol portion 220.

Figure 3:
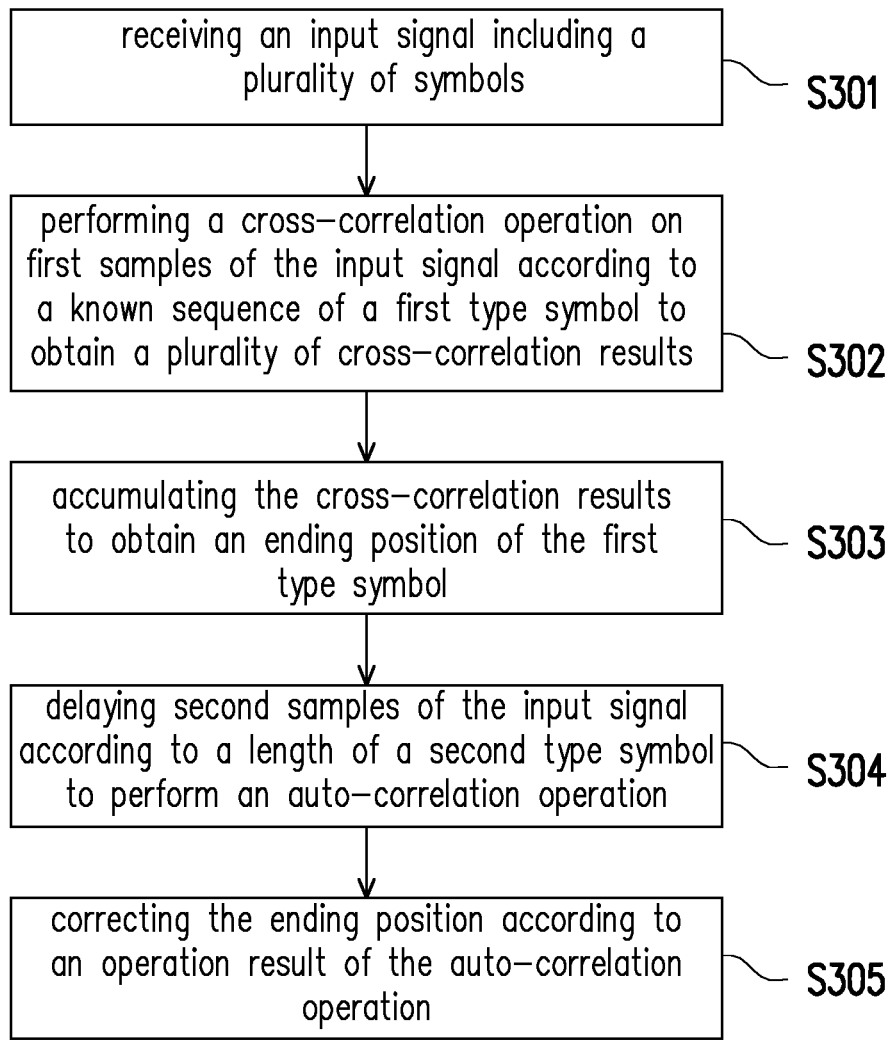
FIG. 3 is a flowchart illustrating a symbol synchronization method according to an embodiment of the disclosure.

FIG. 3 is a flowchart illustrating a symbol synchronization method according to an embodiment of the disclosure. Referring to both FIG. 1 and FIG. 3, in step S301, the receiving circuit 11 receives a signal SI. The signal SI includes a plurality of symbols. In step S302, the symbol synchronization circuit 12 performs a cross-correlation operation according to a known sequence of a first type symbol among the symbols and a plurality of samples (also referred to as first samples) of the signal SI to obtain a plurality of operation results (also referred to as cross-correlation results). The first type symbol may be a short training symbol, and the known sequence is a fixed sequence corresponding to the short training symbol as specified by IEEE 802.11a/n/ac and is used to perform the cross-correlation operation on the short training symbol. Moreover, the known sequence is known to the signal receiving circuit 10, so the known sequence may also be referred to as a local sequence.

Specifically, in step S302, when the symbol synchronization circuit 12 starts to receive the signal SI, the receiving circuit 11 or the symbol synchronization circuit 12 may start a counter to sequentially count the samples received at each time point. Whenever one data (or one sample) in the signal SI is received, the symbol synchronization circuit 12 performs the cross-correlation operation once according to the known sequence of the short training symbol and a plurality of samples selected based on a window width. In an example of a bandwidth of 20 MHz, according to the specification of the IEEE 802.11 standard, the length of each short training symbol is 16 samples, so the window width may be set as 16 samples. Therefore, when the 16th sample data is received after counting started, the symbol synchronization circuit 12 may perform a cross-correlation operation on the sample data (i.e., the 1st to 16th samples) of the time points 1 to 16 and the known sequence of the short training symbol to obtain a cross-correlation result of the time point 16. When the 17th sample data is received, the symbol synchronization circuit 12 may perform a cross-correlation operation on the sample data of the time points 2 to 17 and the known sequence to obtain a cross-correlation result corresponding to the time point 17. Analogously, assuming that the cross-correlation operation is repetitively performed 160 times (i.e., 160 samples in total of 10 short training symbols) according to the number and length of the short training symbols, 160 cross-correlation results can be obtained. When the received samples are fewer than 16, the operation may be performed by using 0 to substitute the missing samples or only performing partial cross-correlation, and the disclosure is not limited thereto.

In an embodiment, the symbol synchronization circuit 12 may obtain the cross-correlation results according to Equation (1) below. In Equation (1), C(n) represents the cross-correlation result of the time point n, t*( ) represents the conjugate of the known sequence, r( ) represents the input signal, and D represents the number of samples used to perform the cross-correlation operation once (i.e., the window width above, or 16 samples in this example).

$$C(n) = \left| \sum_{k=0}^{D-1} r(n-k) \cdot t*(k) \right| \qquad (1)$$

Figure 4A:
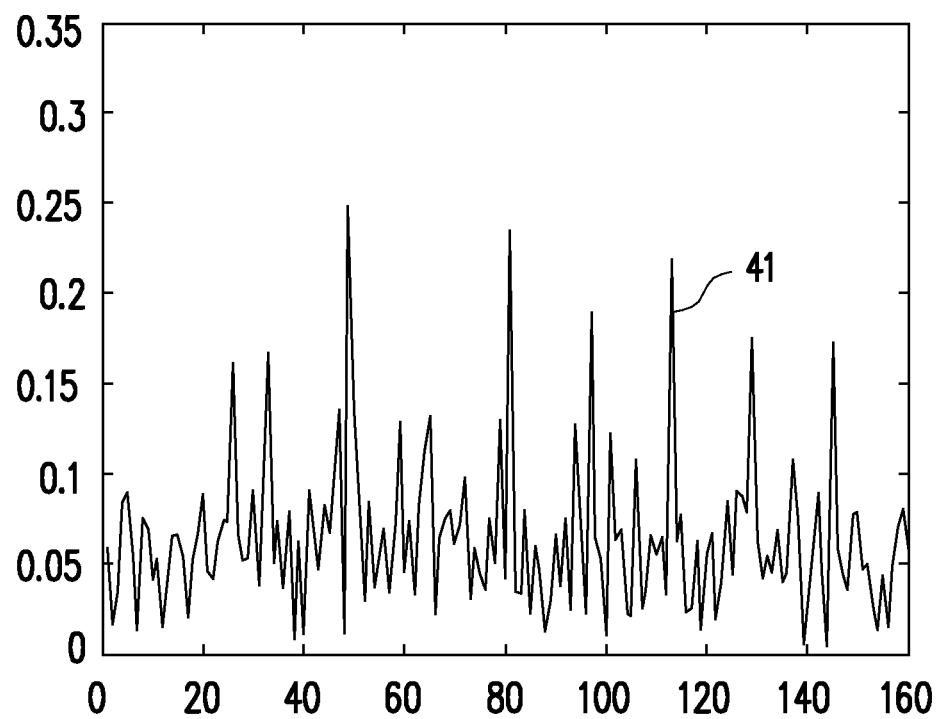
FIG. 4A is a schematic diagram illustrating cross-correlation results according to an embodiment of the disclosure.

FIG. 4A is a schematic diagram illustrating cross-correlation results according to an embodiment of the disclosure. Referring to FIG. 4A, the values of the horizontal axis represent the time points, and the values of the vertical axis represent the cross-correlation results. A curve 41 may be used to represent the cross-correlation results corresponding to the 160 time points obtained in step S302 of FIG. 3. The plurality of cross-correlation results include a plurality of peak values. The positions corresponding to the peak values may be regarded as the boundaries of the short training symbols S0 to S9 in the signal SI. However, when the signal-to-noise ratio of the signal SI is reduced, the generated peak values may not be significant enough for accurately determining the ending positions of the short training symbols.

Therefore, in the present embodiment, the symbol synchronization circuit 12 may accumulate the obtained cross-correlation results to make the peak values more significant. In step S303, the symbol synchronization circuit 12 accumulates the obtained cross-correlation results to further obtain a plurality of accumulation results (also referred to as cross-correlation accumulation results). Specifically, the symbol synchronization circuit 12 may group and accumulate the cross-correlation results according to the length of the short training symbols. Taking FIG. 4A as an example, the symbol synchronization circuit 12 may accumulate the cross-correlation results of the 1st, 17th, 33rd . . . 145th samples at the interval of 16 time points according to the length of the short training symbols to obtain a first accumulation result, and accumulate the cross-correlation results of the 2nd, 18th, 34th . . . 146th samples at the interval of 16 time points to obtain a second accumulation result. Analogously, the symbol synchronization circuit 12 of this example can obtain 16 accumulation results. Next, the symbol synchronization circuit 12 can obtain the ending position according to the maximum value among the obtained accumulation results.

Figure 4B:
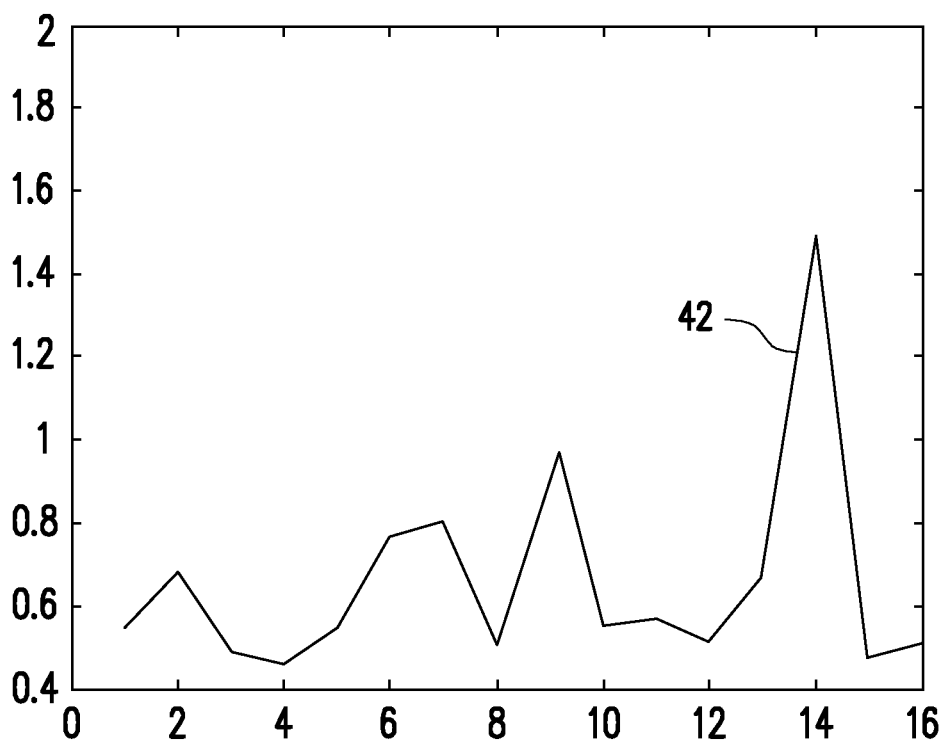
FIG. 4B is a schematic diagram illustrating cross-correlation accumulation results according to an embodiment of the disclosure.

FIG. 4B is a schematic diagram illustrating cross-correlation accumulation results according to an embodiment of the disclosure. Referring to FIG. 4B, the values of the horizontal axis represent the groups of the accumulation results, and the values of the vertical axis represent the accumulation results of the cross-correlation results. A curve 42 may be used to represent the 16 cross-correlation accumulation results obtained in step S303 of FIG. 3.

According to FIG. 4B, assuming that the accumulation result of the 14th group has the maximum value, it means that the positions of the time points 14, 30, 46 . . . 158 corresponding to the 14th group may be respectively the boundaries of the short training symbols. The symbol synchronization circuit 12 may temporarily determine that the last time point 158 (i.e., 160−(16−14)) that belongs to the 14th group after counting started is the boundary of the last short training symbol S9 in the signal SI (i.e., the ending position of the short training symbols).

It is noted that although the embodiment above illustrates 10 short training symbols as an example to describe the operation of performing the cross-correlation operation 160 times and performing accumulation to obtain the ending position of the short training symbol portion 211, part of these short training symbol may be used in the receiving circuit 11 to perform automatic gain control. Therefore, it is likely that the samples of fewer than 10 short training symbols are actually used to perform symbol synchronization. Accordingly, the disclosure is not limited to the cross-correlation operation of 10 short training symbols. According to the actual requirements, the related operation may be configured to perform cross-correlation operations on the samples of 6 short training symbols, for example, to obtain 96 cross-correlation results and perform grouping and accumulation accordingly. Thereby, 16 accumulation results and the maximum value can similarly be obtained to calculate the corresponding ending position accordingly.

It is noted that, as shown in FIG. 2, the short training symbol portion 211 includes the plurality of short training symbols S1 to S9. Therefore, the ending position preliminarily determined by the cross-correlation operation in step S303 of FIG. 3 may be inaccurate. In the present embodiment, the signal SI further includes a second type symbol, and the ending position obtained in step S303 is corrected through an auto-correlation operation of the second type symbol to enhance the accuracy of the determined ending position. In the present embodiment, the second type symbol may be a long training symbol.

Referring back to FIG. 3, in step S304, the symbol synchronization circuit 12 delays a plurality of samples (also referred to as second samples) of the signal SI according to a length of the long training symbol to perform an auto-correlation operation. Similarly, in the example of the bandwidth of 20 MHz, assuming that the length of the long training symbol LTF1 (or LTF2) in FIG. 2 is 64 samples, the symbol synchronization circuit 12 may delay the samples of the signal SI by 64 time points and perform the auto-correlation operation according to the delayed samples. It is noted that the first samples and the second samples are only meant to distinguish among the samples involved in different operations. In other words, the samples involved in the cross-correlation operation (i.e., steps S302 and S303 in FIG. 2) are collectively referred to as the first samples, and the samples involved in the auto-correlation operation (i.e., step S304 in FIG. 2) are collectively referred to as the second samples to avoid confusion.

In step S305, the symbol synchronization circuit 12 corrects the ending position obtained in step S303 according to an operation result (also referred to as an auto-correlation result) of the auto-correlation operation. Compared to the ending position preliminarily obtained in step S303, the ending position corrected in step S305 is more accurate.

Although step S304 takes place after step S302 in FIG. 3, the disclosure is not limited thereto. Steps S304 and S302 may be executed simultaneously. In other words, when the symbol synchronization circuit 12 starts to receive the signal SI, the cross-correlation operation based on the short training symbols and the auto-correlation operation based on the long training symbols may be simultaneously performed on the samples to respectively generate the cross-correlation results and auto-correlation results. Namely, part of the samples in the signal SI are involved in both the cross-correlation operation and the auto-correlation operation. This part of the samples are the first samples when used in the cross-correlation operation and are the second samples when used in the auto-correlation operation.

In an embodiment, the symbol synchronization circuit 12 may obtain the operation result (i.e., the auto-correlation result) of the auto-correlation operation according to Equation (2) below. In Equation (2), A(n) represents the auto-correlation result of the time point n, and D represents the delayed time (for example, D may be equal to the length (e.g., 64) of the long training symbol, and D1 (also referred to as the window width) represents the number of the samples for performing the auto-correlation operation once.

$$A(n) = \left| \sum_{k=0}^{D1-1} r(n-k) \cdot r*(n-k+D) \right| \quad (2)$$

In an embodiment, whenever the symbol synchronization circuit 12 receives one sample, the symbol synchronization circuit 12 uses D1 as the window width and selects D1 samples to perform the auto-correlation operation to generate the auto-correlation result corresponding to the received sample. In the present embodiment, D1 may be X, and X is a positive integer. The auto-correlation result of the auto-correlation operation performed by the symbol synchronization circuit 12 according to X samples is hereinafter referred to as a first auto-correlation result. Specifically, X may be the total length of the guard interval GI and one long training symbol LTF1 (or LTF2) in FIG. 2, or 3/2 of the length of one long training symbol LTF1 (or LTF2) (e.g., 96 samples). Therefore, after the symbol synchronization circuit 12 delays the 1st to 96th samples by 64 time points, an auto-correlation operation of the delayed 1st to 96th samples is performed with the 65th to 160th samples to obtain the first auto-correlation result of the time point 96. Similarly, an auto-correlation operation is performed on the 2nd to 97th samples and the 66th to 161st samples to obtain the first auto-correlation result of the time point 97. Analogously, the symbol synchronization circuit 12 can obtain a plurality of first auto-correlation results and determine the maximum value among them. The symbol synchronization circuit 12 may obtain a correction parameter (also referred to as a first correction parameter) according to the maximum value of the first auto-correlation results. Next, the symbol synchronization circuit 12 can correct the ending position preliminarily obtained in step S303 according to the first correction parameter.

In another embodiment, D1 may be Y, and Y is a positive integer. Specifically, Y may be the length of the long training symbol LTF1 (or LTF2) in FIG. 2 (e.g., 64 samples). The auto-correlation result of the auto-correlation operation performed by the symbol synchronization circuit 12 according to Y samples is hereinafter referred to as a second auto-correlation result. The symbol synchronization circuit 12 may obtain a minimum value according to a plurality of second auto-correlation results and obtain a correction parameter (also referred to as a second correction parameter) according to the minimum value. Next, the symbol synchronization circuit 12 can correct the ending position preliminarily obtained in step S303 according to the second correction parameter. In other words, in steps S304 and S305, the symbol synchronization circuit 12 can generate different correction parameters to correct the ending position according to the different numbers (X or Y) of the samples selected by the auto-correlation operation.

The reason for using the correction parameters obtained in steps S304 and S305 to correct the ending position preliminarily obtained in step S303 is that although the possible ending position (e.g., the samples of the 14th group of the plurality of samples grouped according to the length of the short training symbol) of each of the short training symbols can be preliminarily determined in step S303, since the symbol synchronization circuit 12 does not necessarily receive the samples starting from the first short training symbol in the signal SI, the symbol synchronization circuit 12 cannot determine the ending position of the sample of which order after counting started is the real ending position of the short training symbol portion. Therefore, the symbol synchronization circuit 12 in the present embodiment further corrects and determines the ending position of the last short training symbol (i.e., the short training symbol S9 in FIG. 2) by using the position relationship of the long training symbols and the short training symbols.

Figure 5A:
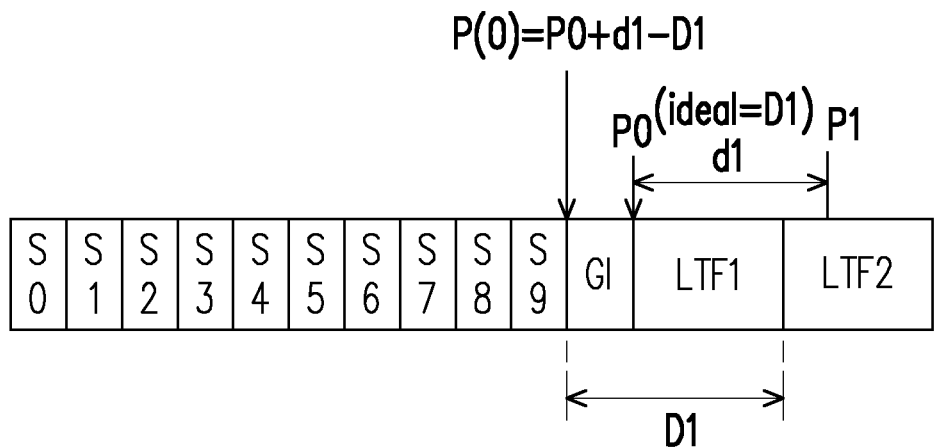
FIG. 5A is a schematic diagram illustrating correction of an ending position according to an embodiment of the disclosure.
Figure 5B:
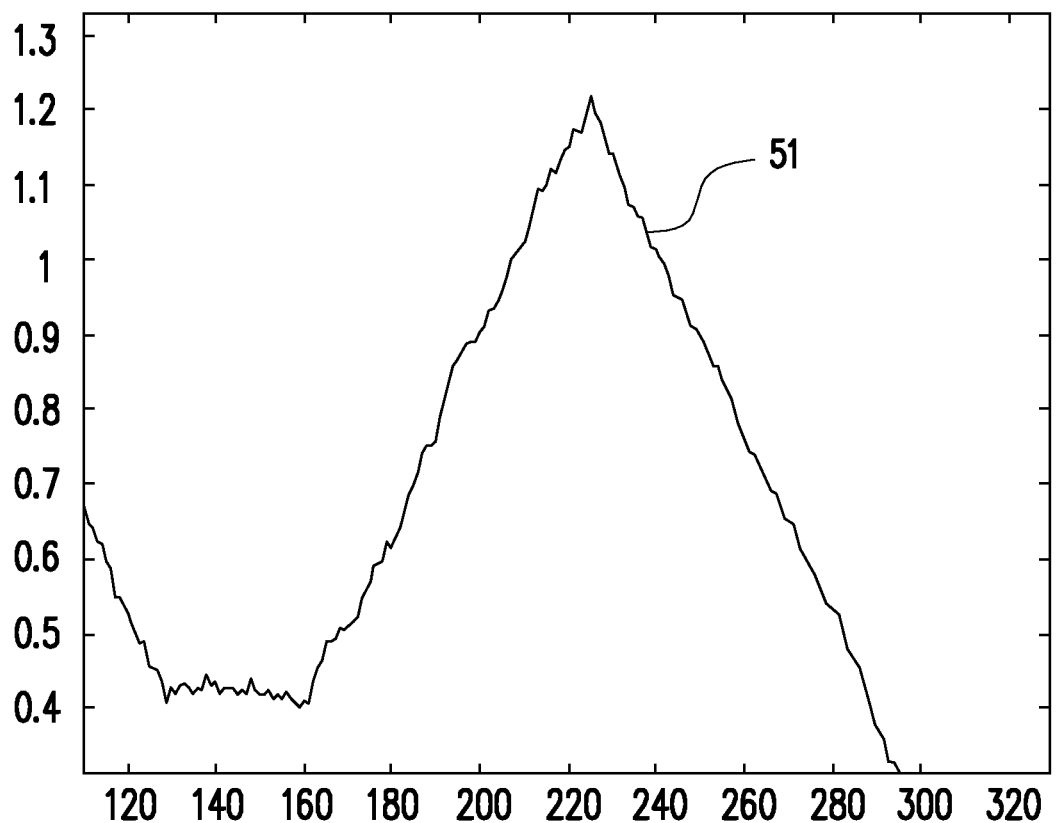
FIG. 5B is a schematic diagram illustrating first auto-correlation results according to an embodiment of the disclosure.

FIG. 5A is a schematic diagram illustrating correction of an ending position according to an embodiment of the disclosure. FIG. 5B is a schematic diagram illustrating first auto-correlation results according to an embodiment of the disclosure. In FIG. 5B, the values of the horizontal axis represent the time points, and the values of the vertical axis represent the first auto-correlation results.

Referring to FIG. 1, FIG. 5A, and FIG. 5B, in the present embodiment, D1 is X (e.g., 96), and the obtained first auto-correlation results are as shown by a curve 51 of FIG. 5B, for example. According to the curve 51, the first auto-correlation result corresponding to the time point 225 (i.e., the peak value position of the curve 51) has the maximum value. According to the characteristics of the long training symbol portion 212 specified by IEEE 802.11a/n/ac, the position of the maximum value of the first auto-correlation results corresponds to the ending position of the long training symbol LTF1.

The symbol synchronization circuit 12 obtains a difference value (also referred to as a first difference value) d1 between positions P1 and P0. Assuming that the position P0 is 158 (i.e., the ending position of the short training symbol portion 211 preliminarily determined in the embodiment of FIG. 4B) and the position P1 is 225 (i.e., the ending position of the long training symbol LTF1 determined in FIG. 5B), the symbol synchronization circuit 12 can determine that the difference value d1 is 67. It is noted that if the difference value d1 is not an integer multiple of the length (which is 16 in this example) of the short training symbol, there might be an error in the determination of the maximum value of the first auto-correlation results of the long training symbol. Therefore, the symbol synchronization circuit 12 may adjust the difference value d1 to the closest integer multiple of 16. For example, the value of the integer multiple of 16 closest to 67 is 64. Therefore, the symbol synchronization circuit 12 can adjust the difference value d1 from 67 to the closest integer multiple of 16 (i.e., 64, which is 16 times 4). Next, the symbol synchronization circuit 12 can regard the difference value d1 (e.g., 64) as the first correction parameter and corrects the position P0 according to the difference value d1. For example, the symbol synchronization circuit 12 can determine whether the difference value d1 is equal to D1 (i.e., X). If the difference value d1 is not equal to D1, the symbol synchronization circuit 12 may subtract D1 from the sum of the position P0 and the difference value d1 to obtain the corrected ending position P(0). In the present embodiment, the corrected ending position P(0) is located at the time point 126 (i.e., P(0)=158+64−96=126).

From another perspective, the position P0 is determined according to the maximum value of the curve 42 in FIG. 4B, and the position P1 is determined according to the maximum value of the curve 51 in FIG. 5B. Therefore, in the ideal state, the position P0 should be located at the ending position (i.e., the position P(0)) of the short training symbols S0 to S9, and the position P1 should be located at the ending position of the long training symbol LTF1. In other words, in the ideal state, the difference value d1 would be equal to D1 (i.e., X). However, in the embodiment of FIG. 5A, since the symbol synchronization circuit 12 does not necessarily receive the samples starting from the first short training symbol in the signal SI, which causes the difference value d1 not to be equal to D1, the symbol synchronization circuit 12 can correct the position P0 to the position P(0) according to the position P0, D1, and the difference value d1 to thereby obtain a more accurate ending position of the short training symbols S0 to S9.

Figure 6A:
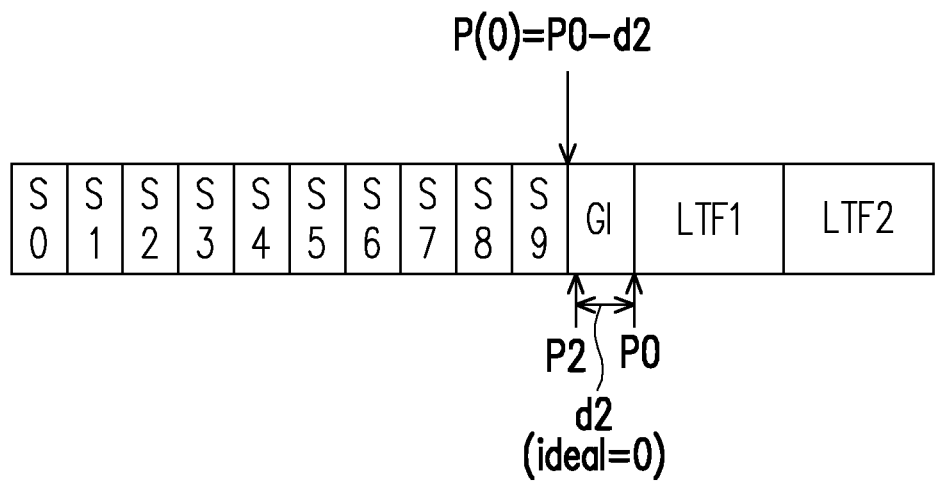
FIG. 6A is a schematic diagram illustrating correction of an ending position according to an embodiment of the disclosure.
Figure 6B:
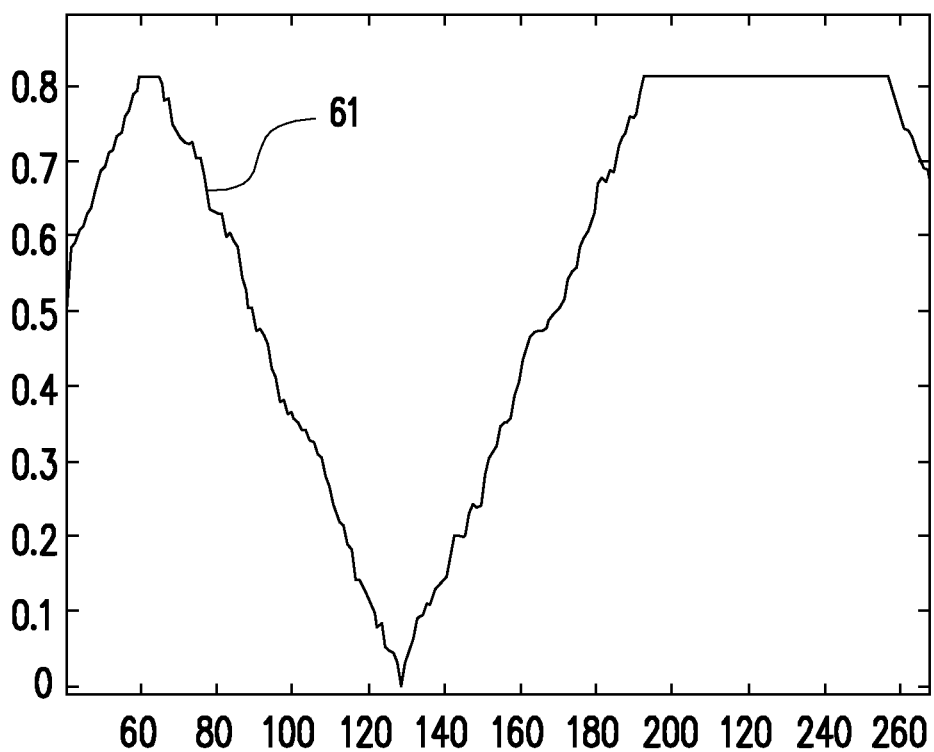
FIG. 6B is a schematic diagram illustrating second auto-correlation results according to an embodiment of the disclosure.

FIG. 6A is a schematic diagram illustrating correction of an ending position according to an embodiment of the disclosure. FIG. 6B is a schematic diagram illustrating second auto-correlation results according to an embodiment of the disclosure. In FIG. 6B, the values of the horizontal axis represent the time points, and the values of the vertical axis represent the second auto-correlation results.

Referring to FIG. 1, FIG. 6A, and FIG. 6B, in the present embodiment, D1 is Y (e.g., 64), and the obtained second auto-correlation results are as shown by a curve 61 of FIG. 6B, for example. According to the curve 61, the second auto-correlation result corresponding to the time point 128 (i.e., the valley value position of the curve 61) has the minimum value. According to the characteristics of the long training symbol portion 212 specified by IEEE 802.11a/n/ac, the position of the minimum value of the second auto-correlation results corresponds to the starting position of the guard interval GI of the long training symbol portion 212, which equals to the ending position of the short training symbol portion 211.

The symbol synchronization circuit 12 obtains a difference value (also referred to as a second difference value) d2 between positions P2 and P0. Assuming that the position P0 is 158 (i.e., the ending position of the short training symbol portion 211 preliminarily determined in the embodiment of FIG. 4B) and the position P2 is 128 (i.e., the starting position of the guard interval GI determined in FIG. 6B), the symbol synchronization circuit 12 can determine that the difference value d2 is −30. It is noted that, as shown in the embodiment of FIG. 5A and FIG. 5B, if the difference value d2 is not a multiple of 16, there might be an error in the determination of the minimum value of the second auto-correlation results of the long training symbol. Therefore, the symbol synchronization circuit 12 can adjust the difference value d2 to the closest integer multiple of 16. For example, the value of the integer multiple of 16 closest to −30 is −32. Therefore, the symbol synchronization circuit 12 can adjust the difference value d2 from −30 to −32. Next, the symbol synchronization circuit 12 can regard the difference value d2 (e.g., −32) as the second correction parameter and correct the position P0 according to the difference value d2. For example, the symbol synchronization circuit 12 can determine whether the difference value d2 is equal to 0. If the difference value d2 is not equal to 0, the symbol synchronization circuit 12 may plus the difference value d2 and the position P0 to obtain the corrected ending position P(0). In the present embodiment, the corrected ending position P(0) is located at the time point 126 (i.e., P(0)=158+(−32)=126).

From another perspective, the position P0 is determined according to the maximum value of the curve 42 in FIG. 4B, and the position P2 is determined according to the minimum value of the curve 61 in FIG. 6B. Therefore, in the ideal state, the positions P0 and P2 should both be located at the ending position (i.e., the position P(0)) of the short training symbols S0 to S9. In other words, in the ideal state, the difference value d2 would be equal to 0. However, in the embodiment of FIG. 6A, since the symbol synchronization circuit 12 does not necessarily receive the samples starting from the first short training symbol in the signal SI, which causes the difference value d2 not to be equal to 0, the symbol synchronization circuit 12 can correct the position P0 to the position P(0) according to the position P0 and the difference value d2 to thereby obtain a more accurate ending position of the short training symbols S0 to S9.

In another embodiment, the symbol synchronization circuit 12 simultaneously performs the auto-correlation operations of D1 being X and D1 being Y in step S304 of FIG. 3 to respectively obtain the maximum value of the first auto-correlation results and the minimum value of the second auto-correlation results. Therefore, in step S305 of FIG. 3, the first correction parameter and the second correction parameter can both be obtained and used together (or one of them can be used) to more accurately correct the ending position preliminarily obtained in step S303.

In an embodiment, after the first difference value and the second difference value are obtained, the symbol synchronization circuit 12 may obtain an evaluation value (also referred to as a first evaluation value) according to the first difference value and obtain another evaluation value (also referred to as a second evaluation value) according to the second difference value. The first evaluation value reflects the precision of the first correction parameter, and the second evaluation value reflects the precision of the second correction parameter. If the ending position is corrected by using the correction parameter with the higher precision, the correction of the ending position can be more accurate. The symbol synchronization circuit 12 may correct the ending position by using one of the first correction parameter and the second correction parameter according to the first evaluation value and the second evaluation value. For example, the symbol synchronization circuit 12 may correct the ending position preliminarily obtained in step S303 of FIG. 3 by selecting the correction parameter with the higher precision from the first correction parameter and the second correction parameter according to the first evaluation value and the second evaluation value.

In an embodiment, when the first difference value and the second difference value need to be corrected, the symbol synchronization circuit 12 may obtain the first evaluation value according to a difference value (also referred to as a third difference value) between the first difference value before correction and the first difference value after correction. For example, the first evaluation value may be equal to the third difference value or is related (e.g., being positively correlated) with the third difference value. The symbol synchronization circuit 12 may obtain the second evaluation value according to a difference value (also referred to as a fourth difference value) between the second difference value before correction and the second difference value after correction. For example, the second evaluation value may be equal to the fourth difference value or is related (e.g., being positively correlated) with the fourth difference value. Moreover, the symbol synchronization circuit 12 may evaluate the precision of the first correction parameter according to the first evaluation value and evaluate the precision of the second correction parameter according to the second evaluation value.

In an embodiment, the first evaluation value is negatively correlated with the precision of the first correction parameter, and the second evaluation value is negatively correlated with the precision of the second correction parameter. Therefore, if the first evaluation value is larger than the second evaluation value, the symbol synchronization circuit 12 can determine that the precision of the second correction parameter is higher than the precision of the first correction parameter and use the second correction parameter, which has the higher precision, to correct the ending position preliminarily obtained in step S303 of FIG. 3. Alternatively, if the first evaluation value is smaller than the second evaluation value, the symbol synchronization circuit 12 can determine that the precision of the first correction parameter is higher than the precision of the second correction parameter and use the first correction parameter, which has the higher precision, to correct the ending position preliminarily obtained in step S303 of FIG. 3.

Taking FIG. 5A and FIG. 6A as an example, in an embodiment, the symbol synchronization circuit 12 may obtain the first evaluation value according to the difference value (i.e., the third difference value, which is 3, for example) between the difference value d1 (i.e., 67) before correction and the difference value d1 (i.e., 64) after correction and obtain the second evaluation value according to the difference value (i.e., the fourth difference value, which is 2, for example) between the difference value d2 (i.e., −30) before correction and the difference value d2 (i.e., −32) after correction. In this example, the first evaluation value is larger than the second evaluation value. Therefore, the symbol synchronization circuit 12 can determine that the precision of the second correction parameter is higher than the precision of the first correction parameter and use the second correction parameter, which has the higher precision, to correct the position P0, as shown in the embodiment of FIG. 6A. However, in another example, if the first evaluation value is smaller than the second evaluation value, the symbol synchronization circuit 12 can determine that the precision of the first correction parameter is higher than the precision of the second correction parameter and use the first correction parameter, which has the higher precision, to correct the position P0, as shown in the embodiment of FIG. 5A.

In an embodiment, the symbol synchronization circuit 12 may perform logical operations (e.g., a modulo operation) respectively on the first difference value before correction and the second difference value before correction to obtain the first evaluation value and the second evaluation value, as long as the obtained first evaluation value and second evaluation value can be used to evaluate the precision degrees of the first correction parameter and the second correction parameter. For example, the first difference value (before correction) is 67 and the second difference value (before correction) is −30. The symbol synchronization circuit 12 may perform a modulo operation respectively on the first difference value and the second difference value according to the length (i.e., 16) of one short training symbol to obtain the first evaluation value of 3 (i.e.; 67 mod 16=3) and the second evaluation value of 2 (i.e., −30 mod 16=2). In this example, since 3 is larger than 2, it means that the precision of the second correction parameter may be higher than that of the first correction parameter. Therefore, the symbol synchronization circuit 12 can determine to correct the ending position according to the second correction parameter.

Moreover, in another embodiment, any operations that take into account the numerical value relationship between the first difference value and the second difference value (or between the third difference value and the fourth difference value) and correct the ending position accordingly all fall in the scope of the embodiments of the disclosure.

In an embodiment, after the ending position P(0) of the short training symbols S0 to S9 of FIG. 2 is obtained, the starting position P(1) of the signaling symbol portion 220 (or the starting position of the signaling symbol SIG) can be determined according to the ending position P(0). For example, the length of the long training symbol portion 212 may be added to the ending position P(0) to obtain the starting position P(1). Thereby, the processing circuit 13 can perform fast Fourier transform on the correct symbol interval according to the obtained starting position P(1) of the signaling symbol portion 220, which reduces intersymbol interference (ISI).

It is noted that although the embodiments above are illustrated with the bandwidth of 20 MHz as an example, in the case of the bandwidth of 40 MHz or 80 MHz, the length of each of the short training symbols is known to be respectively 32 and 64 samples, and the length of each of the long training symbols is respectively 128 and 256 samples. Moreover, the length of the guard interval of the long training symbol is ½ of the length of the long training symbol, and the data of the guard interval is identical to the data of the second half segment of each of the long training symbols. Based on the descriptions in the embodiments above, people skilled in the art shall be able to understand how to adjust the operation rules of the auto-correlation operation and the cross-correlation operation and perform subsequent operations according to the operation results, which shall not be repeatedly described here.

Figure 7:
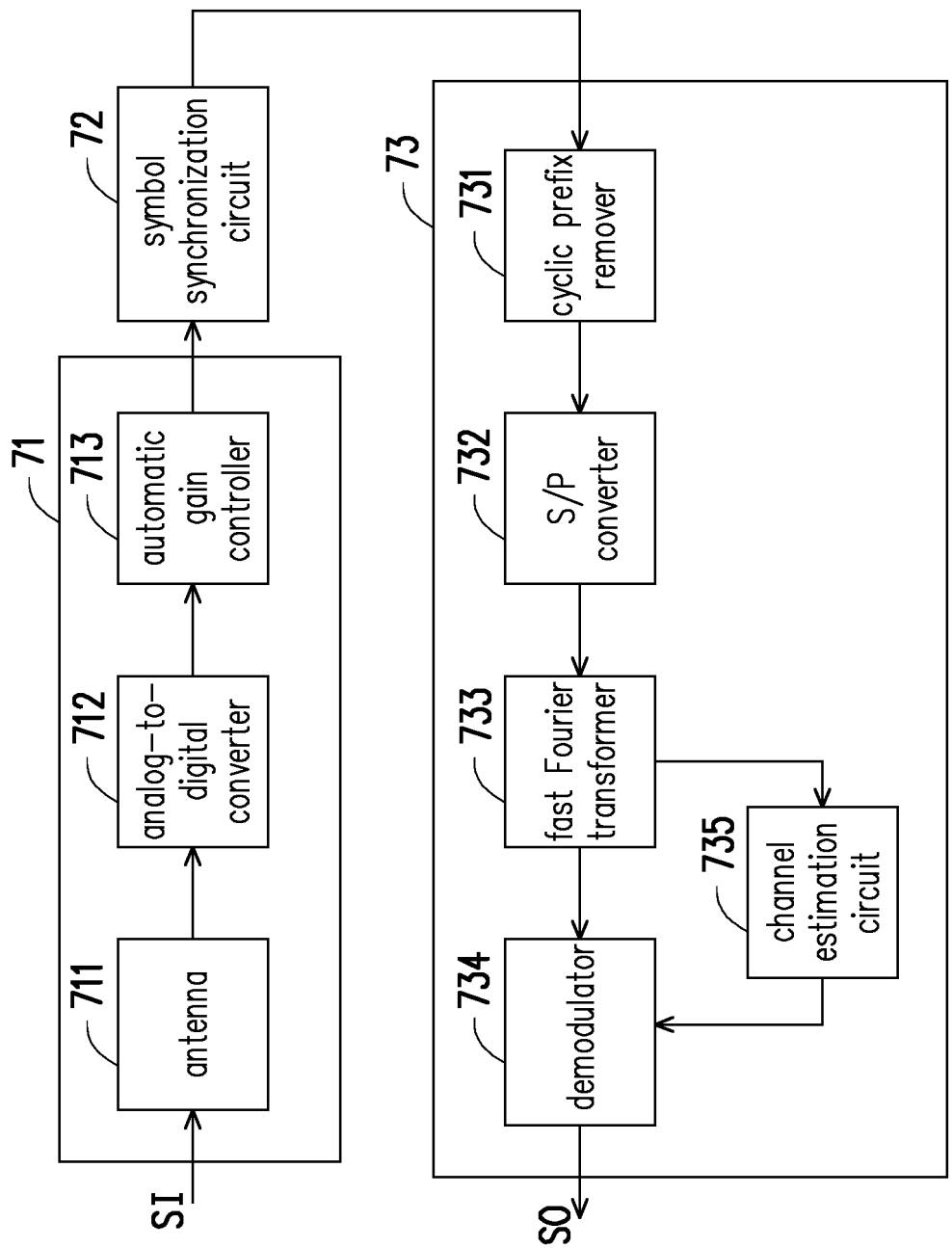
FIG. 7 is a schematic diagram illustrating a signal receiving circuit according to an embodiment of the disclosure.

FIG. 7 is a schematic diagram illustrating a signal receiving circuit according to an embodiment of the disclosure. Referring to FIG. 7, a signal receiving circuit 70 includes a receiving circuit 71, a symbol synchronization circuit 72, and a processing circuit 73. The receiving circuit 71 may include an antenna 711, an analog-digital converter 712, and an automatic gain controller 713. The antenna 711 is configured to receive a signal SI. The analog-digital converter 712 is configured to perform analog-digital conversion on the signal SI. The automatic gain controller 713 is configured to perform automatic gain control (e.g., amplification, signal filtering, and/or channel compensation) on the signal SI.

The symbol synchronization circuit 72 is connected to the receiving circuit 71. The symbol synchronization circuit 72 is configured to confirm or determine the symbol starting position in the signal SI for performing FFT to complete timing synchronization of the signal SI. The symbol synchronization circuit 72 may include at least one of a sampling circuit, a phase-locked loop circuit, a delay-locked loop circuit, a timing recovery circuit, a buffer, a processor, and various controllers to complete the function above, and the disclosure is not limited thereto.

The processing circuit 73 is connected to the symbol synchronization circuit 72. The processing circuit 73 may include a cyclic prefix remover 731, a serial/parallel converter 732, a fast Fourier transformer 733, a demodulator 734, and a channel estimation circuit 735. The cyclic prefix remover 731 is configured to perform cyclic prefix removal on the output of the symbol synchronization circuit 72. The serial/parallel converter 732 is configured to perform serial/parallel conversion on the output of the cyclic prefix remover 731. The fast Fourier transformer 733 is configured to perform fast Fourier transform on the output of the serial/parallel converter 732. The demodulator 734 is configured to perform demodulation on the output of the fast Fourier transformer 733 and output a signal SO (also referred to as an output signal). The channel estimation circuit 735 is configured to perform channel estimation on the output of the fast Fourier transformer 733 and control the demodulator 734 accordingly.

In summary of the above, the disclosure can overcome the positioning error that is likely to occur in the conventional technique of using only the cross-correlation result or the auto-correlation result of the signal, such that the symbol ending position (or the preamble ending position) of the input signal can be more accurately positioned. More desirable positioning effect can be achieved even in the case of a low signal-to-noise ratio, and the time for subsequent repetitive corrections can be reduced. In addition, the disclosure can effectively enhance the signal receiving circuit and the efficiency of symbol synchronization performed by the signal receiving circuit on the input signal.

Although the disclosure is disclosed as the embodiments above, the embodiments are not meant to limit the disclosure. Any person skilled in the art may make slight modifications and variations without departing from the spirit and scope of the disclosure. Therefore, the protection scope of the disclosure shall be defined by the claims attached below.

What is claimed is:
1. A symbol synchronization method comprising:
receiving an input signal which comprises a plurality of symbols;
performing a cross-correlation operation on a plurality of first samples of the input signal according to a known sequence of a first type symbol among the symbols to obtain a plurality of cross-correlation results;
accumulating the cross-correlation results to obtain an ending position of the first type symbol;
delaying a plurality of second samples of the input signal according to a length of a second type symbol among the symbols to perform an auto-correlation operation; and
correcting the ending position according to an operation result of the auto-correlation operation.

2. The symbol synchronization method according to claim 1, wherein the step of accumulating the cross-correlation results to obtain the ending position comprises:
   accumulating the cross-correlation results to obtain a plurality of accumulation results; and
   obtaining the ending position according to a maximum value of the accumulation results.

3. The symbol synchronization method according to claim 1, wherein the step of delaying the second samples of the input signal according to the length of the second type symbol to perform the auto-correlation operation comprises:
   performing the auto-correlation operation with a window width of X samples to obtain a plurality of first auto-correlation results corresponding to the second samples, wherein X is a positive integer; and
   obtaining a first correction parameter according to a maximum value of the first auto-correlation results,
   wherein the step of correcting the ending position according to the operation result of the auto-correlation operation comprises:
   correcting the ending position according to the first correction parameter.

4. The symbol synchronization method according to claim 3, wherein the step of correcting the ending position according to the first correction parameter comprises:
   correcting the ending position according to X and a first difference value if the first difference value is not equal to X, wherein the first difference value is a difference value between the first correction parameter and the ending position.

5. The symbol synchronization method according to claim 1, wherein the step of delaying the second samples of the input signal according to the length of the second type symbol to perform the auto-correlation operation comprises:
   performing the auto-correlation operation with a window width of Y samples to obtain a plurality of second auto-correlation results corresponding to the second samples, wherein Y is a positive integer; and
   obtaining a second correction parameter according to a minimum value of the second auto-correlation results,
   wherein the step of correcting the ending position according to the operation result of the auto-correlation operation comprises:
   correcting the ending position according to the second correction parameter.

6. The symbol synchronization method according to claim 5, wherein the step of correcting the ending position according to the second correction parameter comprises:
   correcting the ending position according to a second difference value between the second correction parameter and the ending position if the second difference value is not equal to 0.

7. The symbol synchronization method according to claim 3, wherein the step of delaying the second samples of the input signal according to the length of the second type symbol to perform the auto-correlation operation further comprises:
   performing the auto-correlation operation with a window width of Y samples to obtain a plurality of second auto-correlation results corresponding to the second samples, wherein Y is a positive integer and X is not equal to Y; and
   obtaining a second correction parameter according to a minimum value of the second auto-correlation results,
   wherein the step of correcting the ending position according to the first correction parameter comprises:
   correcting the ending position according to the first correction parameter and the second correction parameter.

8. The symbol synchronization method according to claim 7, wherein the step of correcting the ending position according to the first correction parameter and the second correction parameter comprises:
   obtaining a first difference value between the first correction parameter and the ending position;
   obtaining a first evaluation value according to the first difference value, wherein the first evaluation value reflects precision of the first correction parameter;
   obtaining a second difference value between the second correction parameter and the ending position;
   obtaining a second evaluation value according to the second difference value, wherein the second evaluation value reflects precision of the second correction parameter; and
   correcting the ending position by using one of the first correction parameter and the second correction parameter according to the first evaluation value and the second evaluation value.

9. The symbol synchronization method according to claim 1, wherein the input signal is compatible with IEEE 802.11 series wireless communication standards, and the symbols belong to a preamble of the input signal.

10. The symbol synchronization method according to claim 1, further comprising:
    obtaining a starting position of a signaling symbol of the input signal according to the corrected ending position.

11. A signal receiving circuit comprising:
    a receiving circuit configured to receive an input signal, wherein the input signal comprises a plurality of symbols; and
    a symbol synchronization circuit, connected to the receiving circuit and configured to perform a cross-correlation operation on a plurality of first samples of the input signal according to a known sequence of a first type symbol among the symbols to obtain a plurality of cross-correlation results, and delay a plurality of second samples of the input signal according to a length of a second type symbol among the symbols to perform an auto-correlation operation,
    wherein the symbol synchronization circuit is further configured to accumulate the cross-correlation results to obtain an ending position of the first type symbol and correct the ending position according to an operation result of the auto-correlation operation.

12. The signal receiving circuit according to claim 11, wherein the operation of accumulating the cross-correlation results to obtain the ending position by the symbol synchronization circuit comprises:
    accumulating the cross-correlation results to obtain a plurality of accumulation results; and
    obtaining the ending position according to a maximum value of the accumulation results.

13. The signal receiving circuit according to claim 11, wherein the operation of delaying the second samples of the input signal according to the length of the second type symbol to perform the auto-correlation operation by the symbol synchronization circuit comprises:
    performing the auto-correlation operation with a window width of X samples to obtain a plurality of first auto-correlation results corresponding to the second samples, wherein X is a positive integer; and
    obtaining a first correction parameter according to a maximum value of the first auto-correlation results, wherein the operation of correcting the ending position according to the operation result of the auto-correlation operation by the symbol synchronization circuit comprises:
  correcting the ending position according to the first correction parameter.

14. The signal receiving circuit according to claim 13, wherein the operation of correcting the ending position according to the first correction parameter by the symbol synchronization circuit comprises:
  correcting the ending position according to X and a first difference value if the first difference value is not equal to X, wherein the first difference value is a difference value between the first correction parameter and the ending position.

15. The signal receiving circuit according to claim 11, wherein the operation of delaying the second samples of the input signal according to the length of the second type symbol to perform the auto-correlation operation by the symbol synchronization circuit comprises:
  performing the auto-correlation operation with a window width of Y samples to obtain a plurality of second auto-correlation results corresponding to the second samples, wherein Y is a positive integer; and
  obtaining a second correction parameter according to a minimum value of the second auto-correlation results,
  wherein the operation of correcting the ending position according to the operation result of the auto-correlation operation by the symbol synchronization circuit comprises:
  correcting the ending position according to the second correction parameter.

16. The signal receiving circuit according to claim 15, wherein the operation of correcting the ending position according to the second correction parameter by the symbol synchronization circuit comprises:
  correcting the ending position according to a second difference value between the second correction parameter and the ending position if the second difference value is not equal to 0.

17. The signal receiving circuit according to claim 13, wherein the operation of delaying the second samples of the input signal according to the length of the second type symbol to perform the auto-correlation operation by the symbol synchronization circuit further comprises:
  performing the auto-correlation operation with a window width of Y samples to obtain a plurality of second auto-correlation results corresponding to the second samples, wherein Y is a positive integer and X is not equal to Y; and
  obtaining a second correction parameter according to a minimum value of the second auto-correlation results,
  wherein the operation of correcting the ending position according to the first correction parameter by the symbol synchronization circuit comprises:
  correcting the ending position according to the first correction parameter and the second correction parameter.

18. The signal receiving circuit according to claim 17, wherein the operation of correcting the ending position according to the first correction parameter and the second correction parameter by the symbol synchronization circuit comprises:
  obtaining a first difference value between the first correction parameter and the ending position;
  obtaining a first evaluation value according to the first difference value, wherein the first evaluation value reflects precision of the first correction parameter;
  obtaining a second difference value between the second correction parameter and the ending position;
  obtaining a second evaluation value according to the second difference value, wherein the second evaluation value reflects precision of the second correction parameter; and
  correcting the ending position by using one of the first correction parameter and the second correction parameter according to the first evaluation value and the second evaluation value.

19. The signal receiving circuit according to claim 11, wherein the input signal is compatible with IEEE 802.11 series wireless communication standards, and the symbols belong to a preamble of the input signal.

20. The signal receiving circuit according to claim 11, wherein the symbol synchronization circuit is further configured to obtain a starting position of a signaling symbol of the input signal according to the corrected ending position.

* * * * *